United States Patent Office

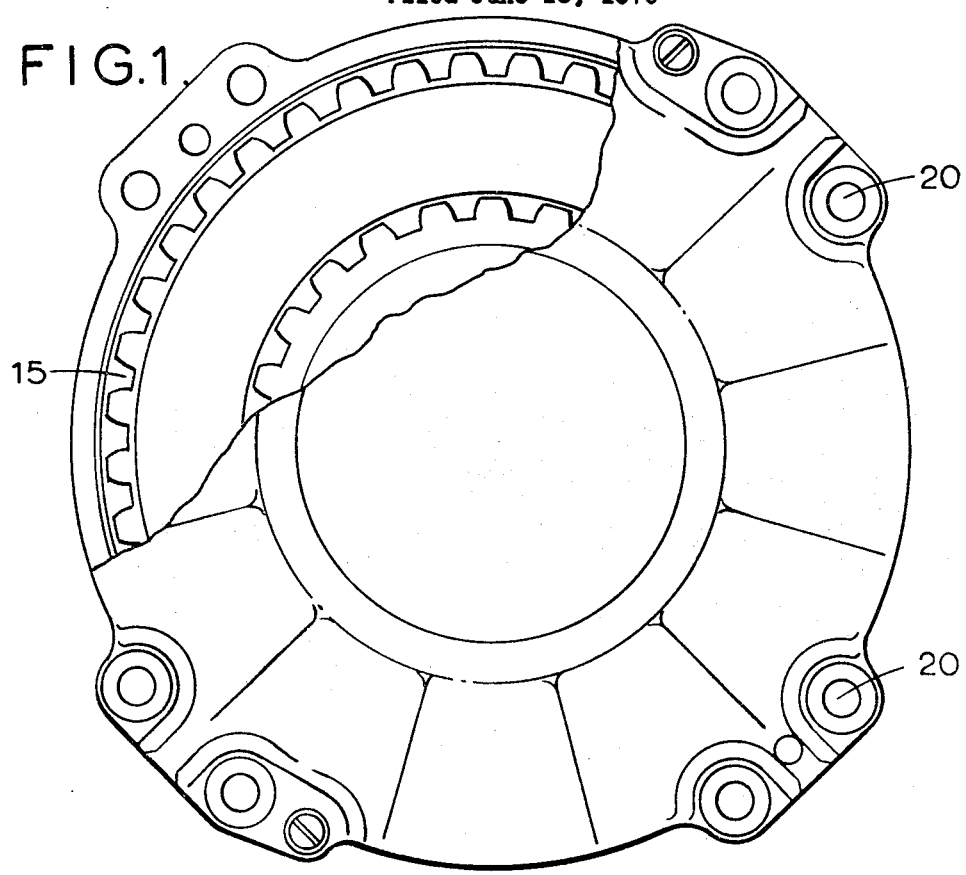
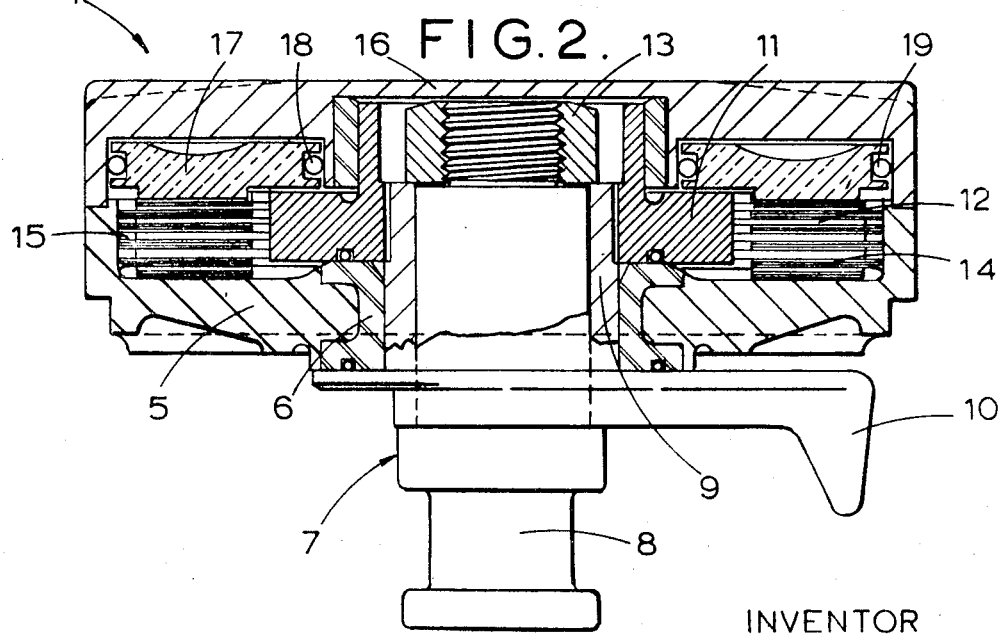

3,667,778
Patented June 6, 1972

3,667,778
ANTIJACK-KNIFING COUPLING DEVICE
Frederick John Charles Hope, Datchet, England, assignor to Self Energising Disc Brakes Limited, Datchet, England
Filed June 18, 1970, Ser. No. 47,362
Claims priority, application Great Britain, June 24, 1969, 31,773/69
Int. Cl. B62d 53/08
U.S. Cl. 280—432                                    5 Claims

ABSTRACT OF THE DISCLOSURE

A fifth wheel coupling is provided for articulated vehicles which includes means for resisting "jackknife" movement between the tractor and trailer units of the vehicle. The coupling embodies a substantially standard king pin engageable with a conventional fifth wheel. Rotatably mounted on the king pin is an annular member which carries a tongue engageable in the slot in the fifth wheel. Braking means are provided, acting between the annular member and the trailer unit for resisting jackknife movement of the vehicle.

BACKGROUND TO THE INVENTION

This invention relates to coupling devices for articulated vehicles and in particular provides a coupling device which includes means for resisting "jackknife" movement between the two components of an articulated vehicle. Such coupling devices are commonly referred to as antijack-knife devices.

In British patent specification No. 1,075,802 and U.S. Pat. No. 3,328,051 to Hope and Lambert (the disclosure of which is specifically incorporated herein by reference) there is described an antijack-knife device in which a king pin is mounted for rotation in the trailer and the king pin is provided with tongue integral therewith and adapted to engage with a slot in a fifth wheel mounted on a tractor. By virtue of the engagement of the tongue with the slot in the fifth wheel, angular movement between the king pin and the tractor is prevented and the normal swinging movement between the tractor and trailer in normal use is accommodated by rotation of the king pin with respect to the tractor. Snubbing of the king pin in potential jackknife situations is achieved by braking means located in the trailer which resist rotational movement between the king pin and the trailer.

I have now realized that there can be a disadvantage in using a king pin having an integral tongue since the king pin is thereby required to withstand both the shear loads imposed by the traction forces and the torsional loads imposed in snubbing jackknife movement. Also the use of a king pin having an integral tongue necessarily involves the use of a non-standard king pin which is more expensive to manufacture than a standard king pin. Furthermore the presence of the tongue makes replacement of the king pin and general maintenance of the device rather complex.

SUMMARY OF THE INVENTION

It is therefore the principle object of this invention to provide a coupling for articulated vehicles which is effective in inhibiting jackknife movement of the vehicle and which does not suffer from the above stated disadvantages.

According to the present invention there is provided a coupling device for coupling first and second components of an articulated vehicle, said device including a king pin for establishing a draught connection between said two components, said king pin being received in an annular member in said first component which member is normally rotatable with respect to said first component and non-rotatable with respect to said second component, and braking means comprising at least a pair of flat braking surfaces for resisting rotational movement between said annular member and said first component.

In a preferred form of the invention, the annular member consists of a sleeve appropriately sized to receive the king pin, the sleeve having a projecting tongue adapted for engagement with the slot of a standard fifth wheel. The sleeve may be connected to a series of flat braking discs which are interleaved with a second series of discs angularly fixed with respect to the first component. Thus movement of the annular member with respect of the fifth wheel can be resisted by compressing together the two series of braking discs.

It will be appreciated that while the device of the present invention is most conveniently located in the trailer so that the king pin and the annular member engage with the fifth wheel mounted on the tractor, the device could be adapted for attachment to a tractor in a manner analogous to that described in British patent specification No. 1,142,849.

BRIEF DESCRIPTION OF DRAWINGS

FIG. 1 is a plan view of a coupling device in accordance with the cover partly broken away to show the interior; and FIG. 2 is a vertical section through the device shown in FIG. 1.

Referring to the drawings the device comprises a housing generally indicated at 1 intended to be rigidly attached to the base plate of a trailer by means of bolts (not shown in the drawing) arranged to be threaded into a tapped ring secured to the upper surface of the base plate. The base plate of the trailer is apertured to receive a base casting 5 which is fitted with a bearing 6 in which is received a king pin assembly generally indicated at 7. The king pan assembly consists of a generally standard king pin 8 which is a press fit within an annular member 9. Annular member 9 is formed integrally with a projecting tongue 10 and is splined to a gear member 11. Gear member 11 is formed around its periphery with teeth for engaging a series of flat annular braking discs 12. The upper end of the king pin 8 is of reduced size and carries a threaded nut 13. The braking discs 12 are interspersed with a further set of braking discs 14 which are secured against angular movement with respect to the housing 1 by means of an internal gear 15 secured to the wall of the casting 5 or formed integrally therewith. Alternatively, the second series of discs may be secured to the housing by means of studs as described in U.S. Pat. No. 3,328,051. Bolts 20 are provided to secure a cover plate 16 to the housing 1. Within an annular space between the cover plate 16 and the stack of discs 12 and 14 is mounted an annular piston 17 provided with O-ring seals 18 and 19. An inlet port is provided for introducing compressed air or hydraulic fluid into the annular space and thus to operate the piston 17.

In use, the device described above engages with a fifth wheel in a similar manner to that described in the above British patent specification No. 1,075,802 and corresponding U.S. patent specification No. 3,328,051.

Specifically, the king pin 8 engages with a fifth wheel on the tractor in the same way as a conventional king pin, while the tongue 10 locates in the fifth wheel slot.

Thus, in operation, the annular member 9 articulates with the fifth wheel and pivotable movement between the tractor and trailer is accommodated by relative angular movement between the two series of braking discs 12 and 14. When it is desired to resist angular movement between the tractor and trailer, as for example in potential jackknife situations, compressed air or hydraulic fluid is introduced through the port. This has the effect of forcing the piston 17 into engagement with the stack of discs 12 and 14 thereby compressing these discs between the piston member itself and the base member 5. In consequence, turning movement of the annular member 9 is resisted and thus also angular movement between the tractor and trailer units.

The coupling device according to the present invention may be operated manually or automatically. Preferably the device is operated automatically in conjunction with the operation of the vehicle road wheel brakes and a pneumatic circuit suitable for this purpose is described, for example, in the above mentioned British and United States patents specifications.

It will be appreciated that by virtue of the fact that the king pin is not rigidly secured to the sleeve member 9, the king pin itself is not subjected to significant torsional loads. Accordingly, the king pin can be secured in place in the housing with a simple lock nut 13. Also, when it is desired to remove the king pin for servicing it is only necessary to remove the lock nut 13 and press the king pin out through the bottom of the trailer.

The king pin need not be rigidly fixed in the housing of the device and may, in normal operation, rotate with the annular member, provided that the bearing surface between the king pin and annular member is such as to prevent application of excessive torsional loads to the king pin when the device is operated.

I claim:
1. A fifth wheel coupling for an articulated vehicle comprising a tractor and trailer and having means for resisting jackknife movement of the vehicle, said coupling comprising:
   a fifth wheel having a slot therein and adapted to be secured to said tractor;
   a king pin adapted to be mounted in the trailer to depend therefrom for reception in said fifth wheel slot;
   an annular member surrounding said king pin and carrying a projecting tongue engageable with the fifth wheel slot so as to be locked for angular movement therewith, said king pin being free to rotate in said annular member at least in response to excessive angular force applied to said annular member; and
   braking means for resisting rotational movement between the annular member and the trailer.

2. A fifth wheel coupling for an articulated vehicle comprising a tractor and trailer and having means for resisting jackknife movement of the vehicle, said coupling comprising:
   a fifth wheel having a slot therein and adapted to be secured to said tractor;
   a king pin mounted in a housing adapted to be secured to said trailer to depend therefrom for reception in said fifth wheel slot;
   an annular member surrounding said king pin and carrying a projecting tongue engageable with the fifth wheel slot so as to be locked for angular movement therewith, said king pin being free to rotate in said annular member at least in response to excessive angular force applied to said annular member; and
   braking means comprising at least one pair of flat braking surfaces for resisting rotational movement between said annular member and said housing.

3. A coupling according to claim 2 wherein said king pin is a press fit in said annular member.

4. A coupling according to claim 2 wherein said king pin is freely rotatable in said annular member.

5. A coupling according to claim 2 wherein said braking means comprises at least one first braking surface mounted on said annular member so as to be non-rotatable relative thereto; at least one second flat braking surface mounted in said housing so as to be non-rotatable relative thereto and at least one of said first and second braking surfaces being slidable into face-to-face engagement with the other of said braking surfaces upon activation of the braking means.

References Cited
UNITED STATES PATENTS

| 3,328,051 | 6/1967 | Hope et al. | 280—432 |
| 3,517,946 | 6/1970 | Rumsey et al. | 280—432 |
| 3,439,936 | 4/1969 | Hines | 280—432 |

LEO FRIAGLIA, Primary Examiner